United States Patent
Vesanto et al.

(10) Patent No.: US 8,549,721 B2
(45) Date of Patent: Oct. 8, 2013

(54) METHOD FOR FORMING A PACKAGE AND A PACKAGE

(75) Inventors: Heli Vesanto, Tampere (FI); Jalliina Jarvinen, Lahti (FI); Niilo Poyhonen, Helsinki (FI); Teemu Karhu, Imatra (FI); Paivi Maatta, Imatra (FI); Juhani Nylander, Joensuu (FI)

(73) Assignee: Stora Enso Oyj, Helsinki (FI)

( * ) Notice: Subject to any disclaimer, the term of this patent is extended or adjusted under 35 U.S.C. 154(b) by 509 days.

(21) Appl. No.: 12/808,112

(22) PCT Filed: Dec. 11, 2008

(86) PCT No.: PCT/FI2008/050729
§ 371 (c)(1), (2), (4) Date: Jun. 14, 2010

(87) PCT Pub. No.: WO2009/074721
PCT Pub. Date: Jun. 18, 2009

(65) Prior Publication Data
US 2010/0264203 A1    Oct. 21, 2010

(30) Foreign Application Priority Data

Dec. 12, 2007 (FI) .................................... 20070973

(51) Int. Cl.
*B23P 25/00* (2006.01)
*B65D 1/00* (2006.01)
*B31B 1/00* (2006.01)

(52) U.S. Cl.
USPC ............................... 29/458; 229/406; 493/52

(58) Field of Classification Search
USPC ............ 29/458, 459, 429, 801, 422; 229/406; 493/52; 211/126.5; 220/600, 63; 425/525
See application file for complete search history.

(56) References Cited

U.S. PATENT DOCUMENTS

| 4,960,376 A | 10/1990 | Udell |
| 2003/0203080 A1 | 10/2003 | Garavaglia et al. |
| 2004/0262322 A1 | 12/2004 | Middleton et al. |
| 2007/0267374 A1 | 11/2007 | Middleton et al. |

FOREIGN PATENT DOCUMENTS

| JP | 60-58823 A | 4/1985 |
| JP | 8-207924 A | 8/1996 |
| JP | 9-239872 A | 9/1997 |
| JP | 10-34702 A | 2/1998 |
| JP | 2005-519819 A | 7/2005 |
| WO | WO 02/45944 A1 | 6/2002 |
| WO | WO 03/078012 A1 | 9/2003 |

OTHER PUBLICATIONS

Detailed Response to Written Opinion dated Mar. 17, 2010—International Patent Application PCT/FI2008/050729.

(Continued)

*Primary Examiner* — John C Hong
(74) *Attorney, Agent, or Firm* — Birch, Stewart, Kolasch & Brich, LLP

(57) ABSTRACT

In a method for forming a package, a package with the shape of a container is formed of a cardboard blank, the package having a bottom and side walls extending upwards from the bottom. At the end stage of compression molding, a rim of molding material extending sideways is molded to the upper part of the side walls when the mold is kept closed in such a way that a mold cavity corresponding to the rim is formed by moving a counter surface inside the mold backwards from a surface opposite to it, after which the molding material is introduced into the mold cavity.

6 Claims, 5 Drawing Sheets

(56) References Cited

OTHER PUBLICATIONS

International Search Report—PCT/FI2008/050729, (Mar. 17, 2010).
Finnish Search Report—20070973, (Oct. 14, 2008).
International Preliminary Report on Patentability, dated Sep. 8, 2010, for Application No. PCT/FI2008/050729.
English translation of Decision of granting a patent for invention issued May 24, 2012, in Russian Patent Application No. 2010128544.
Japanese Office Action dated Feb. 19, 2013 of Application No. 2010-537483 with English Translation.

METHOD FOR FORMING A PACKAGE AND A PACKAGE

FIELD OF THE INVENTION

The invention relates to a method for forming a package, wherein a package with the shape of a container is formed of a cardboard blank, the package having a bottom and side walls extending upwards from the bottom. Such a package is used as a so-called tray package for keeping food, wherein it is hermetically sealed with a lid. To attach the lid to the package, the edge of the container must be equipped with a horizontal rim or flange extending from the upper end of the side walls and encircling the package. The upper surface of this flange normally comprises a suitable coating, by means of which the lid can be attached to the package tightly. For example, it is very common to use heat-sealable plastic materials to attach the lid part to the package. Examples of food packages and package materials used therein are mentioned, inter alia, in documents WO 03/033258, EP 1 289 856, WO 00/21854, and U.S. Pat. No. 5,425,972.

BACKGROUND OF THE INVENTION

The above-described package is normally formed of a flat blank by pressing it to shape in a mould. Thus, the coating of the cardboard, which forms the inner surface of the package, also forms the upper surface of said flange which will come into contact with the lid.

Sometimes there is a need to provide the edge flange with a material that is suitable for fixing the lid but is not necessarily required in the middle part, that is, inside the package, or that is even unsuitable as a material inside the package. Another problem may also be posed by insufficient mechanical properties, for example insufficient rigidity, of the edge flange. The choice of materials for the inner part of the package should not excessively determine the materials for the edge flange. A method is also known to form the edge flange independently of the rest of the package, as disclosed in international patent document WO 03/078012 and the corresponding US application publication 2004/0262322, presenting a method in which the rim of a tray-like package is moulded of a plastic material separately. This document discloses a solution, in which the blank is provided with the joined together at their edges with moulded plastic material, after which the plastic rim is moulded to the upper edges of said side walls, to form a flange extending outwardly from them and encircling the package. Publications JP 8207924 and JP 10034702 describe also this kind of solutions wherein the edge rim of a tray-like package is injection moulded separately. In these publications the tray is composed from separate side-wall and bottom parts being joined to each other by forming before the injection moulding phase of the edge rim.

According to publication 2004/0262322, the packages made by press-forming are always first equipped with the edge flange, to which the plastic material is attached by moulding, for example under the flange or at its edge, as an extension of the flange outwards, as shown, for example, in FIGS. 59 to 63 and 66 of the publication. Furthermore, the document mentions the possibility of forming a tray-like package "in-mold"; in other words, the press-forming and the moulding of the plastic material to the edge take place in the same mould. This is shown in more detail in FIGS. 70 to 76 of the publication, which illustrate the feeding of moulding material underneath the edge flange all the way to the outer surface of the side wall and as a horizontal extension to the upper surface of the flange, and in FIGS. 77 to 80, which illustrate a mould for implementing this. The upper surface of the edge flange of the package, that is, the surface coming against the lid, is tightly against a shutoff surface during the moulding phase. The mould may comprise several openings for supplying moulding material at the circumference of the package. Also the publication JP 60058823 describes a method to form a container provided with edge rim being injection moulded in a same mould as where a tray of the container (having D-shaped side wall) has been formed. In this solution the side wall and bottom of the tray has been formed from one blank comprising side wall part and bottom part being shaped and connected to each other during the moulding phase with the help of moulding material. Furthermore, US patent application publication 2007/267374 discloses also method for forming this type of packages. In this document the tray is formed by means of press forming. After the press forming the edge flange of the container is injection moulded to the upper edge of the tray in same mould wherein the press forming has been performed. The document describes several embodiments wherein different kinds of edge flanges are shown. In these embodiments the edge flange or rim is injection moulded either on to the outer surface or on to the inner surface or such that it encapsulates fully the upper edge of the tray. This document represents the closest prior art in view of the present invention. The dimensions of the forming and moulding tool, especially the shapes of the surfaces defining the mould cavity, determine the final dimensions of the plastic part at the edge of the package, which dimensions must be taken into account already when designing the forming tool. It must be possible to keep the cardboard blank with a given holding force between the shutoff surfaces of the mould up to the end of the forming step, so that the package is formed evenly at all sides and a good-quality product is obtained. By the method presented in the publication, the plastic part can only be moulded underneath the edge flange.

The patent document U.S. Pat. No. 4,960,376 discloses a mould apparatus for forming a container wherein mould is formed by means of side, end and corner sections being movable in respect of each other. The annular cavity encircling the main cavity for forming the body of the container functioning as a mould for the handling ring (i.e edge flange) is formed to the moulding apparatus by moving the corner section backwards from the surface opposing to it before injecting the moulding material in to this cavity. After extruding phase the shape of this cavity is changed by moving the end section and the corner section of the apparatus such that a desired shape of the edge flange is formed and simultaneously the mould material is compressed against the corner of the body of the container such that these are welded to each other. Although this kind of mould apparatus improves the possibilities of changing the shapes of the moulding cavity it does not give any solution to the above mentioned problem with the holding surface of the upper edge of the tray-like container. It has also other drawbacks since it requires separate injection (extruding) and compression phases while the sections of the mould apparatus has to be moved back and forth making the implementation and use of the method much more complicate as in the methods described in above mentioned other documents.

SUMMARY OF THE INVENTION

It is an object of the invention to present a method, by which the material can be moulded in a more versatile manner to the edge of the package in connection with forming of the package, without compromising the quality of the cardboard part of the package. Furthermore, it is an object of the invention to present a package which has been made by—a novel moulding method according to invention.

The method for implementing this according to the invention is primarily characterized in that, in the upper part of the side walls, a rim of moulding material extending sideways is moulded at the final stage of the compression moulding when the mould is kept closed, in such a way that the mould cavity corresponding to the rim is formed by moving a counter surface inside the mould backwards from a surface opposite to it, after which the moulding material is introduced into the mould cavity. In the cavity, the material is cured to form a solid flange, after which the mould is opened and the finished tray-shaped package is removed from the mould.

In the above-described manner, the whole circumference of the package can be provided with a moulded rim which has an upper surface consisting of the moulding material, which is different from the cardboard, and which can be selected by taking into account its function in conjunction with the lid that will later seal the package. The counter surface to be moved backwards may act as a retaining surface for obtaining a sufficient retaining force also at the edges of the blank at the very end of the forming stage. In principle, thanks to the invention it is possible to mould rims whose dimensions in the thickness direction are not limited to only one possible. Similarly, the method can be used for moulding a sidewardly extending rim fully of moulding material, directly at the upper edge of the cardboard side wall of the package. In this way, it is possible to make packages with novel shapes which will be described in more detail hereinbelow.

The movement can be arranged at the holding surface or shutoff surface of one of the mould halves in an area encircling the package-to-be in a ring-like fashion. This movement is in the order of a few millimeters only, advantageously from 0.4 to 2 mm, wherein the thickness of the moulded rim is in the same order. However, the invention is not limited to these dimensions only.

The package according to the invention, in turn, is characterized in that the package formed of a cardboard blank by compression moulding comprises an edge flange formed of moulding material joining the upper edge of the side walls of the package at an angle and extending directly sideways from them and that the rim has been moulded at the final stage of the compression moulding when the mould is kept closed, in such a way that the mould cavity corresponding to the rim has been formed by moving a counter surface inside the mould backwards from a surface opposite to it, after which the moulding material has been introduced into the mould cavity. The joint between the moulding material and the cardboard package may also extend to the inside of the side walls of the package.

BRIEF DESCRIPTION OF THE DRAWINGS

In the following, the invention will be described with reference to the appended drawings, in which.

DETAILED DESCRIPTION OF THE INVENTION

Figure 1:
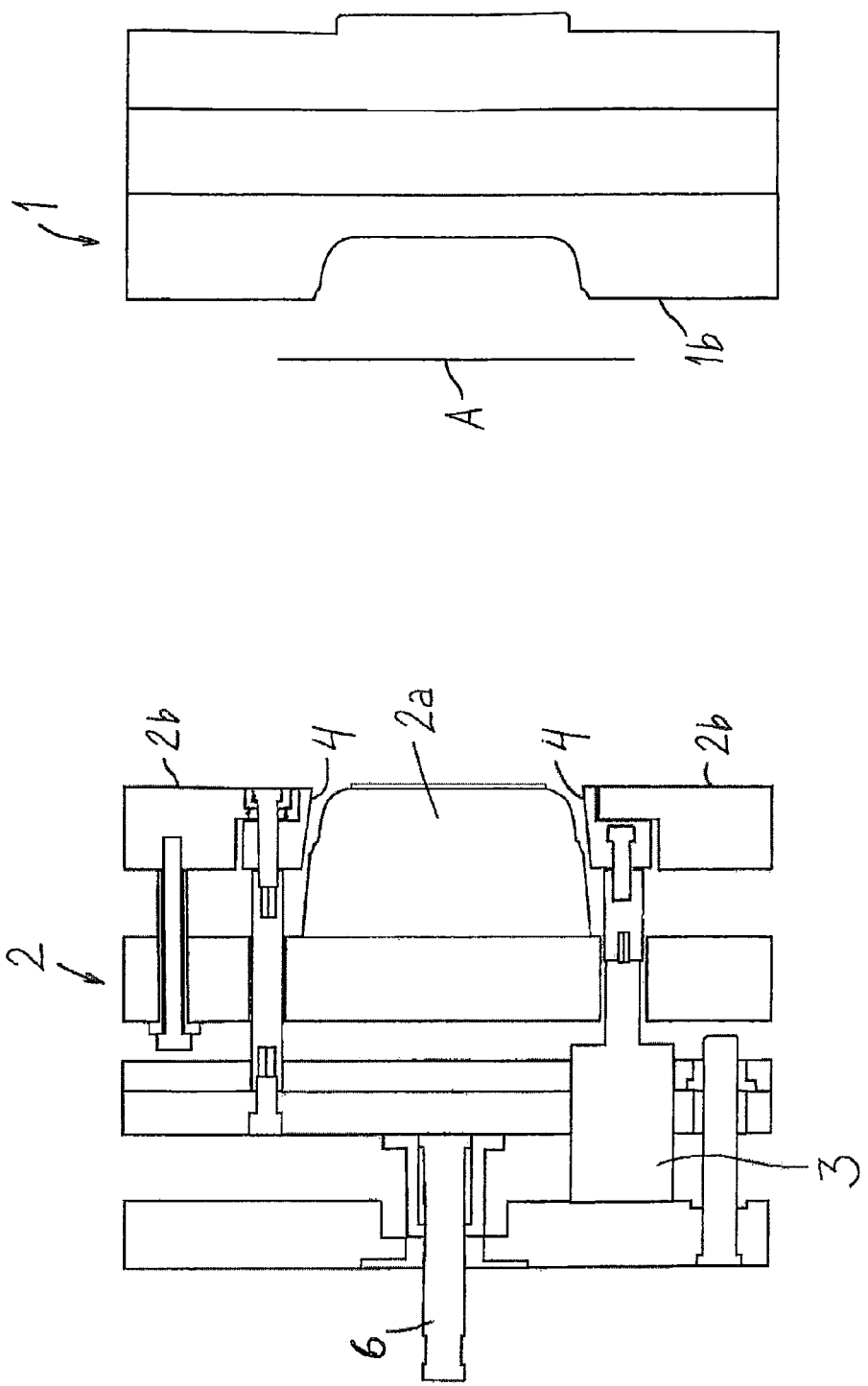
FIGS. 1 to 4 show the different steps of forming the package, starting from a flat blank.

FIG. 1 shows a cross-sectional view of a forming and moulding tool for forming a package, starting from the forming of the package and ending in the forming of the rim. The tool is a kind of a compression and cast mould, intended for forming, in a first step, a substantially flat cardboard blank A with an even thickness into a package with the shape of a container, which can also be called a tray. The tool is also provided with an integrated moulding function for the moulding of material to the edges of the package shaped by compression.

The tool comprises a first mould half 1 or "front mould", which comprises a recess 1a, against which the flat blank A is shaped and which determines the general shape of the package (bottom, the shape of the side walls extending from the bottom, the inclination of the side walls, the roundings off, etc.), as well as a second mould half" or "rear mould", which presses the blank into said recess 1a. For this purpose, the rear mould is equipped with a so-called forming core 2a that fits into said recess 1a so that the blank is pressed between the core and the recess and obtains its final form. The mould halves, or the front mould and the rear mould, are arranged to be movable in relation to each other for closing and opening the mould by arrangements which are not described in more detail in this context. In the mould shown in the drawings, the front mould 1 is the solid part and the rear mould 2 is the moving part.

The rear mould 2 comprises, in a ring-like manner around the core 2a, a shutoff surface 2b that faces a corresponding surface 1b encircling the recess 1a in the front mould 1. When the mould is closed (the mould halves 1, 2 come together), these surfaces come against each other. This shutoff surface 2b also acts as an ejection surface in an ejection part that can be moved in relation to the core 2a in its depth direction. The ejection part thus moves between a front position (shown in FIG. 1) and a rear position (shown in FIGS. 3 and 4). The holding force of the shutoff surface 2b can be controlled by means of an actuator 3 driven by pressurized medium and fixed to the rear mould 2. This actuator 3 is preferably a pneumatic cylinder.

The core 2a is also encircled by a collar ring 4 which is capable of making a short reciprocating motion in relation to the shutoff surface 2b and whose front surface can be moved to be aligned with the ejection surface or to lie a very short distance backwards from it. When the front surface of the collar ring 4 is flush with the shutoff surface 2b, it is, in a way, part of the shutoff surface. This front surface of the collar ring also exerts a holding force on the cardboard blank between the shutoff surfaces. Consequently, the collar ring 4 is placed inside the ejection part, between the ejection part and the core 2a.

Figure 2:
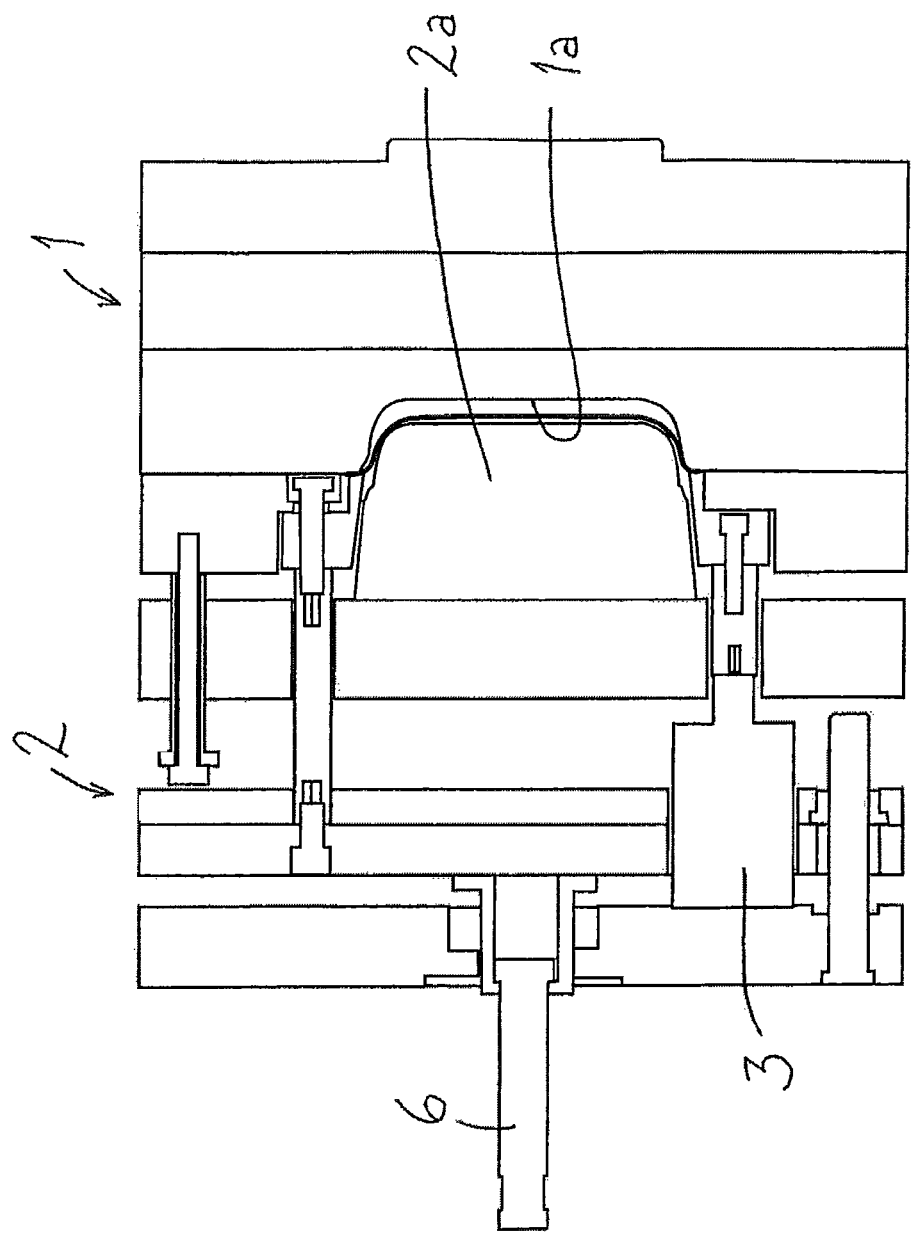
Figure 3:
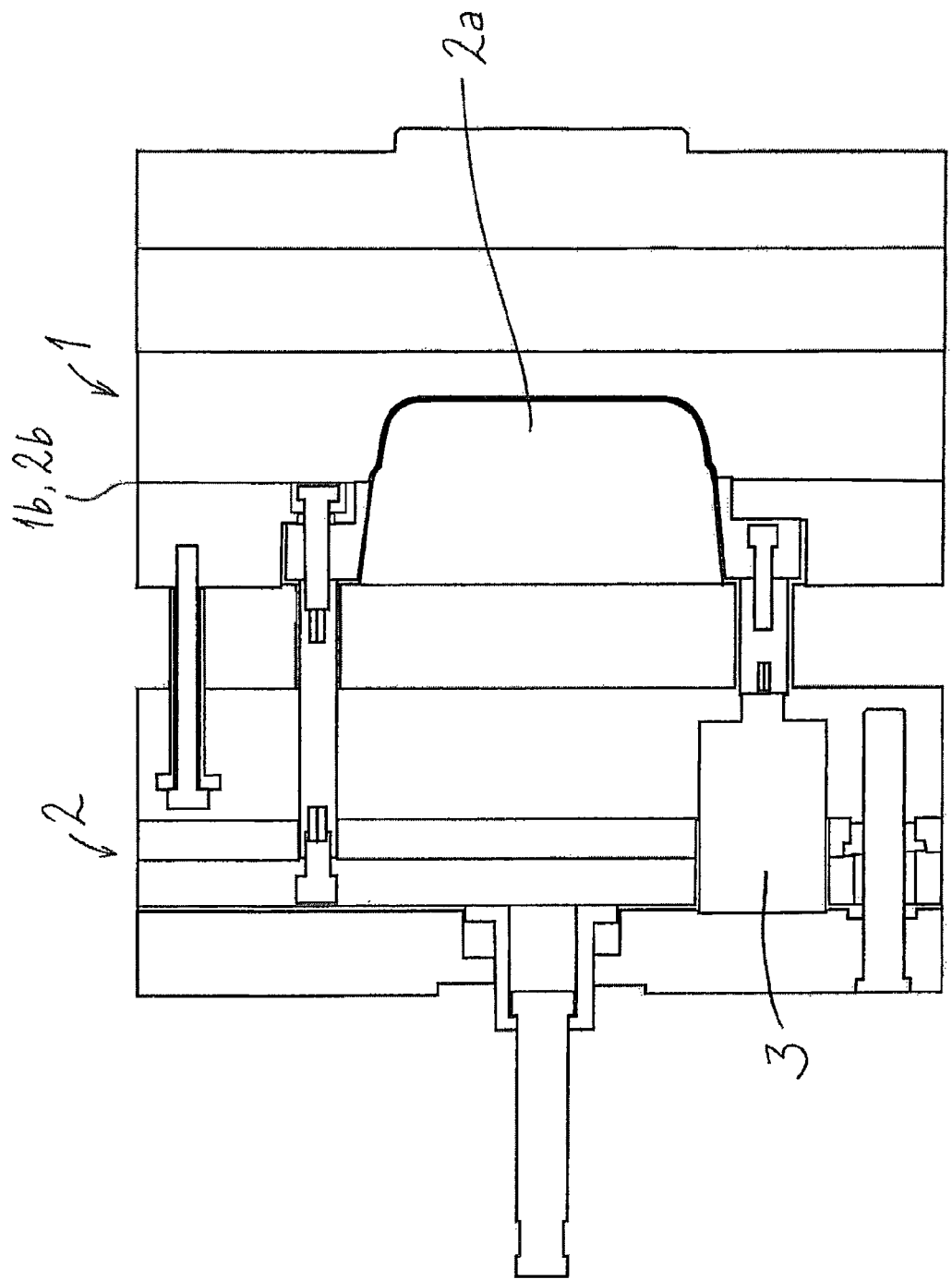

FIG. 1 shows the situation before the closing of the mould. The blank A to be pressed into shape is brought by a robot into small holders (not shown) in the front mould 1. After this, the mould is closed, the core 2a is pressed into the recess 1a, and the blank remaining therebetween is pressed into a container with the shape of a tray. FIG. 2 shows the step in which the core 2a starts to form the blank after being pressed into the recess 1a. The shutoff surface 2b, including the front surface of the collar ring 4, leans forward by the force of the actuator 3, preferably by pressurized air, and holds the blank A at its edges between the shutoff surface 2b and the corresponding shutoff surface 1b of the front mould 1 in the pressing step. FIG. 3 shows a situation, in which the mould is fully closed and the blank A is pressed to form a tray in such a way that its outermost edge (the upper edge of the side walls of the tray) is aligned with the front surface of the collar ring 4 or slightly in front of it. The last holding force on the edges of the blank was caused by the front surface of the collar ring 4 facing the shutoff surface of the front mould that encircles the recess 1a in the front mould.

Figure 4:
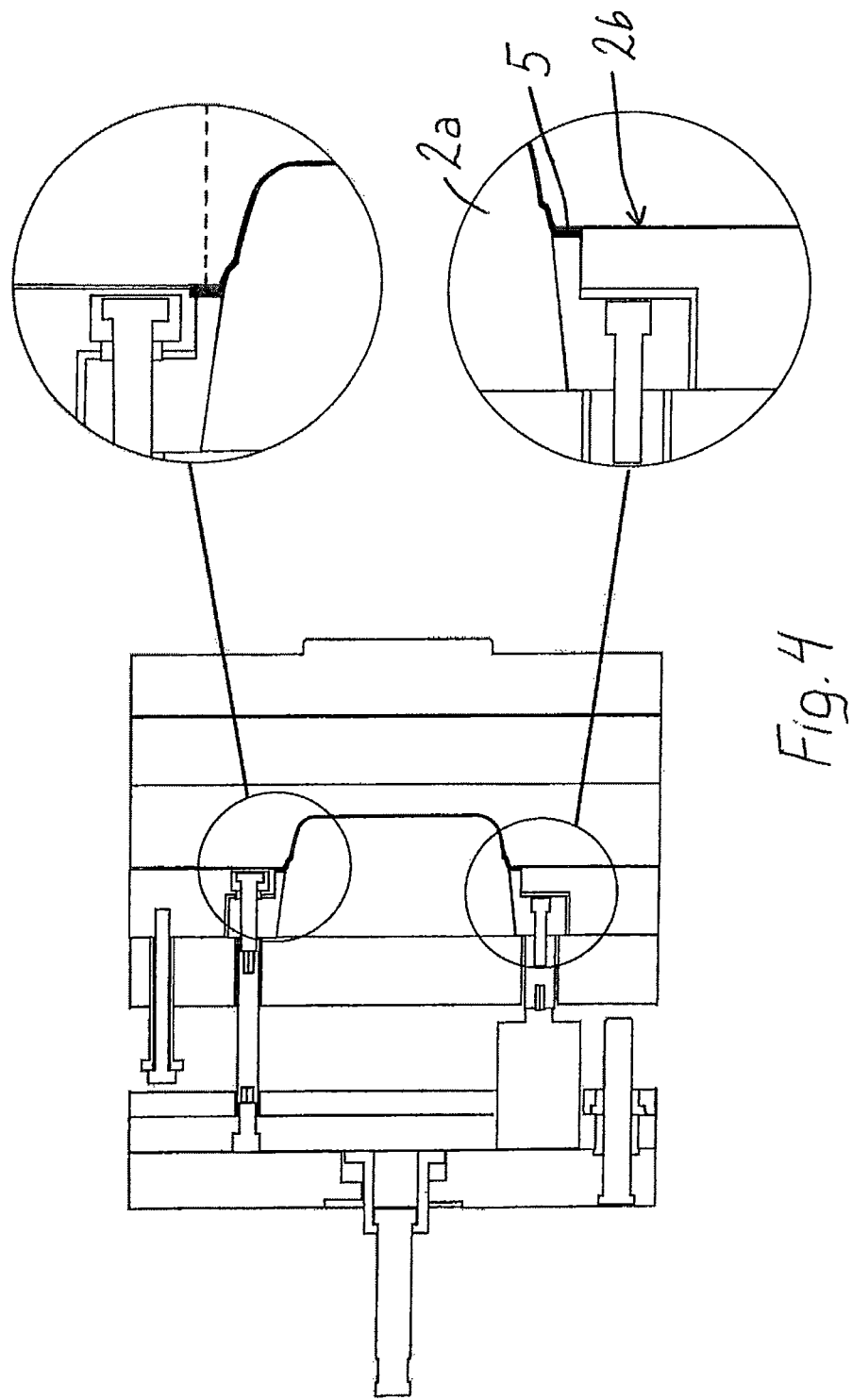

FIG. 4 shows a situation, in which the mould is still closed but the collar ring 4 has moved a short distance backwards from the shutoff surface 1b of the front mould 1, that is, towards the rear mould 2. The movement is exerted by an actuator making a precise movement, for example by pulling an ejection rod 6 by means of an ejection motor. Thus, a small mould cavity 5 is left between the surface encircling the recess 1a in the front mould 1, the inner surface of the ejection part, the front surface of the collar ring 4, and the outer surface of the core 2a, which cavity is connected to the outer edge of the tray and encircles the tray in a ring-like manner. When molten plastic material is fed into this mould cavity, it forms a flange-like rim extending outwards from the side walls of the tray. This situation is illustrated by the detailed views of FIG. 4, which show the position of the core 2a, the ejection surface 2b, the shutoff surface 1b of the front mould, and the blank A formed to a tray, as well as the collar ring 4 at the step of injecting the moulding material. In the rear position, the collar ring 4 is tightened against the core 2a, thanks to the conical shape of these, to secure the tightness of the mould cavity 5. The channel for injection of moulding material is preferably introduced via the front mould 1, and one channel that opens in the shutoff surface 1b of the front mould at the mould cavity 5 is illustrated with a broken line. The injection channels may be evenly distributed around the cavity 1a, for example at corners, if the tray to be shaped has the general shape of a rectangle.

Figure 5:
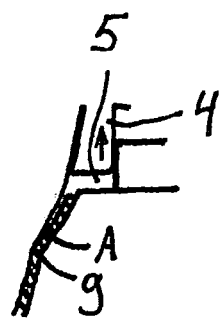
FIG. 5 shows a detail of the mould just before the injection of the moulding material.

The detailed views of FIG. 5 show how the side walls of the tray at their upper parts are bent outwards with a sharp bend in relation to the lower part, thanks to the corresponding design of the core 2a and the recess 1a. At this "nipping point" formed by the outer surface of the core 2a and the inner surface of the recess 1a, the blank is pressed against the inner wall of the recess 1a, wherein the moulding material has access from the cavity 5 across the outer edge of the blank, that is, the upper edge of the ready formed tray, also to the inside of the tray, wherein the surface of attachment of the rim or flange to the blank material becomes larger. Furthermore, the upper edge of the blank remains slightly underneath the shutoff surface of the front mould 1. It should be noted that all the detailed views showing cross-sections illustrate the situation on the circumference of the whole package.

After the molten plastic material has solidified in the cavity 5, the mould can be opened to the open position again. The ejection part is then still in the rear position. When the ejection part is pushed by the ejection bar 6 to the front position, it removes the finished container T from the rear mould 2, and simultaneously the collar ring 4 can be moved again to the front position, that is, the position shown in FIG. 1 is reassumed. Then, the robot takes out the finished container and brings a new blank A in its place, after which the work stages are repeated as described above.

To make edge flanges with varying thicknesses, it is possible to make dimensionally different collar rings 4 for one mould, which collar rings produce mould cavities of different dimensions when in the rear position.

Figure 6:
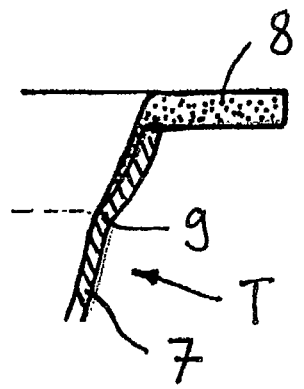
FIG. 6 shows the point of contact between the side wall and the flange of the package in a cross-sectional view.

FIG. 6 shows a cross-sectional view of the edge of a finished container T made by compression moulding and casting, having an outwards substantially horizontally extending flange formed according to the invention and fixed to the upper edge of the side wall 7 of the container T as well as to the inner surface of the tray a short distance from the upper edge. The moulding material supplied into the cavity 5 and forming the flange 8 may extend inside the tray all the way to the sharp bend 9 produced in the compression moulding step.

The cross-section of the upper part of the container shown in FIG. 6 is also substantially similar to that in FIG. 6 in its whole circumference, taking into account the fact that in a container having the horizontal cross-sectional shape of a rectangle with rounded edges, the flange may extend farther from the upper edge of the side walls in the corners than along the straight sides.

Figure 7:
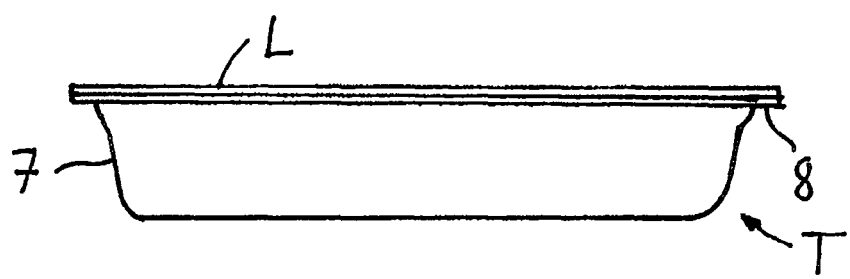
FIG. 7 shows a closed package.

FIG. 7 shows the finished closed package. The tray-like finished container T is closed with a lid L so that the lid is sealed at its lower surface to the upper surface of the plastic rim 8, resulting in a package sealed on all sides.

As raw materials in the manufacture, it is possible to use materials commonly known for tray packages and plastic moulding. As the blanks A, of which the cardboard part of the tray is made, it is possible to use coated (for example coated with plastic on one or both sides) or uncoated cardboards. The method for coating the cardboard may be dispersion coating or extrusion coating. Cardboard refers to a fibre-based product which may have variable grammage, is suitable for packaging purposes, and can be formed by pressing. The coating of the cardboard, which forms the inner and/or outer surface of the container T, may, especially in view of use for food, consist of a known barrier material which prevents the leaking out of substances from the food to the outside or the entry of substances into the food from the outside of the package. It should be noted that as the flange 8 can be made of a material different from the coating of the cardboard, the coating can be selected without taking into account its functioning as a tight sealing material and/or a material facilitating the reclosing in conjunction with the lid L of the package, or the package may also be uncoated.

Suitable moulding materials include various thermoplastics which are melt processable; in other words, they can be supplied in molten state into the mould cavity, in which they solidify and attach directly to the cardboard or the plastic coating of the cardboard, forming simultaneously a rigid edge flange. Suitable polymers, on which these plastics are based, include polyolefins, polyesters and polyamides. Environmentally friendly moulding materials include biodegradable plastics, such as any of the following: polylactide (PLA), biodegradable polyester, starch-based plastics or polyhydroxy alkanoate, particularly PHB. In this way, the recyclability of the package can be improved as a whole, even though it has been made partly by injection moulding. The above-mentioned biodegradable plastics may also be used as materials for coating the cardboard blank A.

The lid L may be made of any material. The lid is preferably made of cardboard whose lower surface has been coated with a material that is compatible with the material of the flange L, for example for sealing the lid tightly and/or for allowing reclosability. The lid may also be a plastic film comprising one or more layers and sealed to the upper surface of the flange 8. Such a film may be transparent so that the content of the package can be viewed without opening the package. It is also possible that the lid L, irrespective of its material, is attached to the flange 8 mechanically only.

Even if the above-described package is particularly well suited for packaging of food in a tight manner, it is also suitable for products other than food, in which case it is possible to select the material for moulding the flange 8 by taking into account factors other than the air-tight closure required for food.

The shape of the container T may also be different from that described above; what is important is that it can be shaped by compression moulding to achieve a shape whose upper edge can be provided by moulding with a rim that is approximately in the same plane therewith. For example, there may be compartment shapes in the bottom part of the container. The horizontal cross-section of the container does not need to be polygonal, but it may be oval or even circular.

The invention claimed is:

1. A method for forming a package, wherein a package with the shape of a container is formed of a cardboard blank, the package having a bottom and side walls extending upwards from the bottom, wherein in the upper part of the side walls, a rim of moulding material extending sideways is moulded at the final stage of compression moulding when the mould is kept closed, in such a way that a mould cavity corresponding to the rim is formed by moving a counter surface, which is an annular part of a holding surface encircling a forming core of the mould, inside the mould backwards from a surface opposite to it, after which the moulding material is introduced into the mould cavity.

2. The method according to claim 1, wherein the length of the movement of the counter surface backwards is 0.4 to 2 millimeters.

3. The method according to claim 1, wherein the same moulding material is also moulded inside the side walls of the package.

4. The method according to claim 3, wherein in compression moulding, a bend is formed in the side wall, which bend expands the upper part of the wall outwards to guide moulding material from the mould cavity to the inside of the side walls.

5. The method according to claim 1, wherein the rim is moulded totally of the moulding material directly to an upper edge of the side walls, to extend sideways thereof.

6. The method according to claim 1, wherein the container-shaped package is closed with a lid by attaching the lid to the rim.

* * * * *